United States Patent
Hope

[15] 3,659,422
[45] May 2, 1972

[54] METHOD AND APPARATUS FOR AIRCRAFT PROPULSION

[72] Inventor: Jack I. Hope, Palos Verdes Peninsula, Calif.

[73] Assignee: North American Rockwell Corporation, El Segundo, Calif.

[22] Filed: Nov. 4, 1966

[21] Appl. No.: 592,086

[52] U.S. Cl. ............................................. 60/224
[51] Int. Cl. .............................................. F02k 3/12
[58] Field of Search .................... 60/224, 225, 226, 244, 263

[56] References Cited

UNITED STATES PATENTS

| | | | |
|---|---|---|---|
| 3,149,461 | 9/1964 | Eichholtz | 60/225 |
| 3,161,018 | 12/1964 | Sandre | 60/244 |
| 3,172,253 | 3/1965 | Schelp | 60/263 |
| 3,279,191 | 10/1966 | Keenan | 60/263 |
| 3,340,689 | 9/1967 | Kueng | 60/226 |

FOREIGN PATENTS OR APPLICATIONS

881,967  11/1961  Great Britain ........................... 60/224

Primary Examiner—Martin P. Schuader
Assistant Examiner—Douglas Hart
Attorney—William R. Lane, H. Frederick Hamann and Charles F. Dischler

EXEMPLARY CLAIM

1. An aircraft propulsion system comprising a main gas generator, an air bypass duct associated with said main gas generator for passing air around said main gas generator; at least one auxiliary gas generator located adjacent to said main gas generator; means for compressing inlet air, said means being driven by said main gas generator; means for directing the output air of said compressor means to the inlet of said main gas generator, said air bypass duct and said auxiliary gas generator; said main gas generator, bypass duct and auxiliary engine each having a separate exhaust nozzle means; and means for selectively and alternatively governing the airflow in said bypass duct and said auxiliary engine, said last named means including means for varying the area of at least said bypass duct and auxiliary gas generator exhaust nozzle means.

18 Claims, 12 Drawing Figures

INVENTOR.
JACK I. HOPE

BY

ATTORNEY

INVENTOR.
JACK I. HOPE

BY
ATTORNEY

METHOD AND APPARATUS FOR AIRCRAFT PROPULSION

The present invention relates to an aircraft propulsion system and more particularly an engine arrangement and control utilizing a plurality of gas generators to selectively achieve variations in propulsion of the aircraft to conform to the requirements of different missions.

Many variable cycle propulsion systems have been attempted during recent years for application to mixed mission aircraft which require efficient propulsion over a broad range of both subsonic and supersonic operating conditions. Many of these prior art systems achieve the variability in the cycle by varying the components of a given engine such as a turbojet or turbofan. Others of these prior art systems utilize both turbojet and turbofan engines which are independently energized depending upon the desired aircraft operation. These systems have proven to be highly inefficient. Various methods of augmenting engine performance have also been used in order to obtain more efficient aircraft operation for mixed missions. Augmentation such as the burning of additional fuel behind the turbine of the turbojet (afterburning), burning fuel behind the fan of a turbofan, mixing the fan air and gas generator air and burning the mixture, have all been used or proposed to achieve more efficient propulsion system matching and performance. These approaches, while providing a closer match between aircraft drag and engine thrust, have fallen short of the efficiency required. Other suggestions for improving the efficiency of the propulsion system have also been made. These suggestions include variable compressor stators, variable turbine stators, variable bypass valves and similar schemes to produce a variable flow characteristic in the basic engine cycle. Some improvement and flexibility in system operation has resulted from these various approaches but optimum aircraft-propulsion system matching has not been attained by these prior art methods.

It is therefore the principal object of the present invention to provide a propulsion system and method for operating such a system for mixed mission aircraft.

It is a further object of the present invention to provide a propulsion system and method in which improved propulsion system vehicle matching is achieved.

It is a still further object of the present invention to provide an improved propulsion method and system in which optimum selection of airflow direction and quantity is possible for various operating conditions.

It is another object of the present invention to provide a propulsion system and method in which the high pressure components are physically divided so that a wide range of aircraft flight conditions can be met by a single unit while providing optimum performance at each condition.

It is another object of the present invention to provide a propulsion system and method utilizing a plurality of integrated small size turbine engines to achieve a substantial reduction in aircraft weight.

It is another object of the present invention to provide a propulsion system and method utilizing separated high pressure components to achieve geometric flexibility in propulsion system configuration.

It is another object of the present invention to provide a method and system for propulsion utilizing a turbofan cycle for pressurizing at least one selectively operable auxiliary engine.

It is still another object of the present invention to provide a method and system for aircraft propulsion using pressurized fan air at the auxiliary engine compressor inlets to achieve a very rapid starting of the auxiliary engines.

It is still another object of the present invention to provide a method and system for propulsion utilizing a plurality of integrated propulsion units each having separate controllable exhaust outlets.

It is still another object of the present invention to provide a propulsion system particularly adapted for use with an integrated control system in which inlet, gas generator and outlet characteristics are automatically matched for maximum overall propulsive efficiency.

These and other objects of the present invention will be more apparent from the following detailed description and claims together with the accompanying drawings, made a part thereof, in which:

Aircraft designed to meet multiple mission requirements must employ a flexible engine cycle to provide the best performance for each mission mode. A turbofan engine provides the best performance for aircraft operating at high subsonic speeds, while a turbojet engine gives better performance at supersonic speeds. Heretofore engine design thrust has been matched with vehicle mission requirements for each mission mode by changing the design condition for turbine inlet temperature and overall pressure ratio for turbojet engines, and by changing these same parameters along with the air bypass ratio and fan pressure ratio for the turbofans. The subsonic performance of turbojets is inherently poorer than that of turbofans but even the dry performance of separate flow-duct burning, or mixed flow-afterburning turbofans suffers because of the presence of the burner in the fan airflow path. The augmented performance of the afterburning turbofan engines is not as good as that of turbojets because the low bypass air pressures make afterburning inefficient.

The present invention avoids these problems of the prior art arrangements by combining the best features of the turbofan system, e.g., good subsonic cruise performance, with those of a turbojet system, e.g., good supersonic and acceleration performance. The present invention comprises an engine system having a main gas generator of the turbofan type in which the low pressure fan is selectively utilized to provide supercharged air to the main gas generator, i.e., compressor, combustor and turbine, and bypass air that can be used either as fan bypass for the main gas generator or as a supply of air for an auxiliary gas generator. The engine system is preferably fully integrated with the variable air inlets and exhaust nozzles by a control system. Alternatively, a semi-automatic system utilizing pilot control of the air inlet, fan, main gas generator, auxiliary engine and nozzles may be utilized in accordance with well-known aircraft control practices. The automatic control system integrated into the preferred embodiment utilizes primary parameters scheduled from a single power demand input and closed through appropriate variables for precise control of the primary parameters. Thus, operation of the inlet, fan, main gas generator, auxiliary engines and nozzles is integrated by the control system to accommodate the air handling characteristic of the inlet duct for optimum overall system performance.

ENGINE ARRANGEMENT

Figure 1:
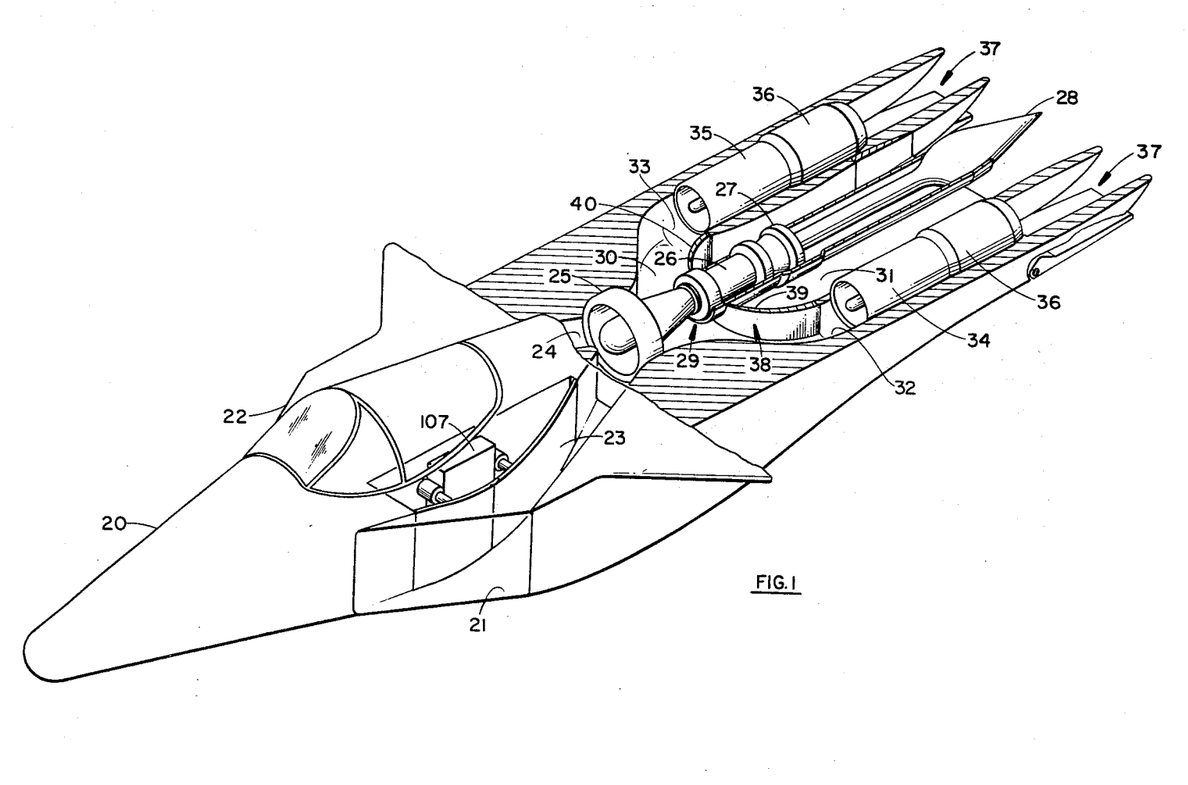
FIG. 1 is a partially sectioned perspective view of the engine arrangement of the preferred embodiment of the present invention.

Referring now to FIG. 1 in detail, an aircraft propulsion system is schematically represented in which an aircraft fuselage 20, with the wing members cut away for clarity of description, is shown having a pair of air inlet ducts 21 and 22 located on opposite sides of the fuselage 20. The ducts 21 and 22 direct air through aerodynamically designed channels 23 and 24, respectively, to the inlet of a low pressure fan or compressor 25. The low pressure fan 25 is mechanically coupled through a centrally disposed high pressure gas generator 26 to power turbine 27. The exhaust of the power turbine 27 is directed rearwardly through the primary exhaust nozzle indicated generally at 28 and described in detail hereinafter with respect to FIG. 5. The low pressure compressor 25, gas generator 26, power turbine 27 and exhaust nozzle 28 constitute the primary turbofan engine 29.

Figure 2:
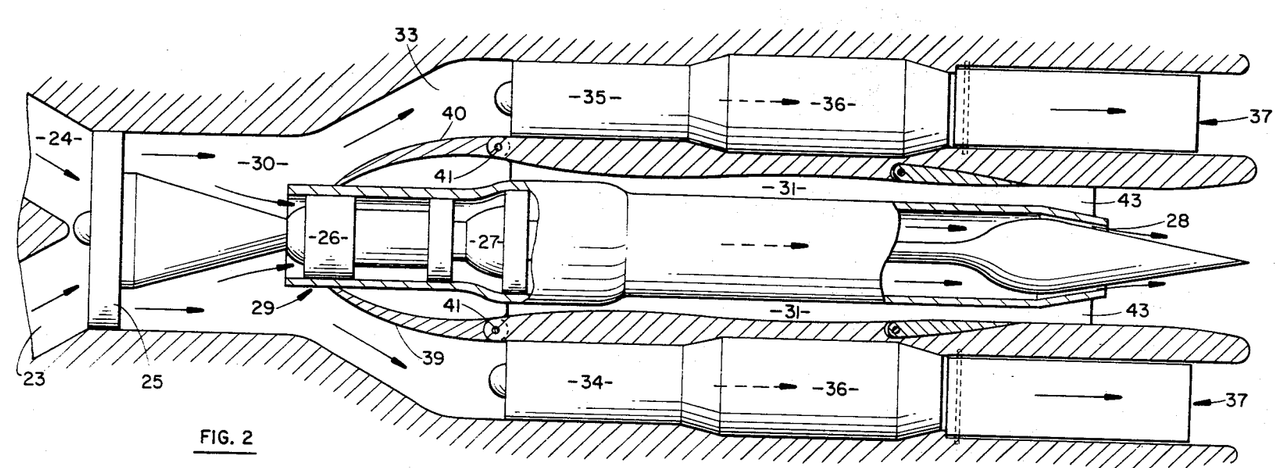
FIG. 2 is a partially sectioned plan view of the engine arrangement of the preferred embodiment of the present invention.

The supercharged air discharged from compressor 25 enters a fan air collector duct 30 which is connected to the inlet of gas generator 26, to a bypass channel 31, preferably annular in shape, for the primary engine 29, and through auxiliary engine inlet ducts 32 and 33 to a pair of auxiliary gas generators 34 and 35 (see also FIG. 2). The pressure losses in the collector duct 30 must be kept to a minimum and, therefore, a relatively constant cross-sectional area is maintained in this duct and auxiliary ducts 32 and 33. The auxiliary gas generators 34 and 35 are preferably arranged in pairs on opposite sides of the main gas generator 29, although an odd number of auxiliary engines may be used where aircraft performance requirements allow. Each auxiliary gas generator preferably has an afterburner 36 and each has a separate variable area exhaust nozzle, indicated generally at 37, and described in detail hereinafter with respect to FIG. 6.

Located between the fan air collector duct 30 and the auxiliary ducts 32 and 33 is a gas diverting valve means 38 which includes movable baffle plates 39 and 40, preferably having a configuration which minimizes losses. The baffle plates 39 and 40 of the preferred embodiment are rotatably mounted on separate shafts 41 (see FIG. 2) which are preferably interconnected for syncronous movement between the two different airflow controlling positions shown in FIGS. 2 and 3. This valving means 38 directs the flow of pressurized air from duct 30 through either bypass 31 or gas generators 34 and 35. Under ordinary subsonic flight conditions the baffles 39 and 40 are positioned to direct all the air from compressor 25, which does not flow into the inlet of high pressure gas generator 26, into the bypass duct 31 around the primary engine 29 (see FIG. 3). Where supersonic aircraft performance is required operation of gas generators 34 and 35 is initiated as described in detail hereinafter and the baffles 39 and 40 direct pressurized air into ducts 32 and 33 while closing bypass channel 31.

The performance characteristics of the engine arrangement of the preferred embodiment of the present invention utilizing commercially available engines when compared with existing engines establishes that the fuel consumption is considerably improved. Moreover, the integrated propulsion system shown in FIGS. 1 through 3 has a higher available maximum thrust for energy maneuverability, has better supersonic specific fuel consumption and is capable of afterburning operation at much higher altitudes because of the much higher afterburner pressure levels. The approximate engine characteristics for the preferred embodiment are indicated generally in Chart I.

GENERAL ENGINE CHARACTERISTICS

| | |
|---|---|
| Overall compression ratio | 10–25 |
| Fan pressure ratio | 1.5–3.2 |
| Bypass ratio | 2–4 |
| Turbine inlet temperature | 2460–2860°R. |

Fan Characteristics

| | |
|---|---|
| Design pt. $W_a$ | 300 lb./sec. |
| Design pt. fan pressure ratio | 1.5–3.2 |
| Design pt. adiabatic efficiency | 86.1% |
| Peak Adiabatic efficiency | 88% |
| Fan inlet Mach number | 0.55 |
| Fan outlet Mach number | 0.5 |
| Fan tip speed (max.) | 1600 ft./sec. |

Compressor Characteristics

| | |
|---|---|
| Design pt. $W_a$ | 600–100 lb./sec. |
| Design pt. pressure ratio | 4–16 |
| Design pt. adiabatic efficiency | 85.5% |
| Peak adiabatic efficiency | 87% |
| Compressor inlet Mach number | 0.55 |
| Compressor outlet Mach number | 0.3 |
| Compressor tip speed (max.) | 1200 ft./sec. |

Pressure Loss From Fan Discharge to Compressor Inlet

| | |
|---|---|
| To main gas generator | 0% |
| To side gas generator | 1.5% |

Main Burner

| | |
|---|---|
| Design efficiency | 98.5% |
| Design pressure drop | 3% |

Compressor Turbine

| | |
|---|---|
| Design adiabatic efficiency | 90% |
| Peak adiabatic efficiency | 90% |
| $T_4$ control limits | 2460 to 2860°R. |
| Compressor turbine tip speed (max.) | 1400 ft./sec. |
| Pressure drop between compressor turbine and fan turbine | 0.5% |
| Cooling flow for turbine | 3–5.6% |

Fan Turbine

| | |
|---|---|
| Design pt. efficiency | 90% |
| Cooling flow for turbine | 0–1.6% |
| Fan turbine tip speed (max.) | 1400 ft./sec. |

Afterburner

| | |
|---|---|
| Burner pressure loss | 5% dry, 7½% max. |
| Minimum A/B temperature rise | 400°R. |
| Maximum A/B temperature | 3770°R. |

Duct Pressure Losses

| | |
|---|---|
| Fan duct | 2% |
| Gas generator | 1% |

Figure 3:
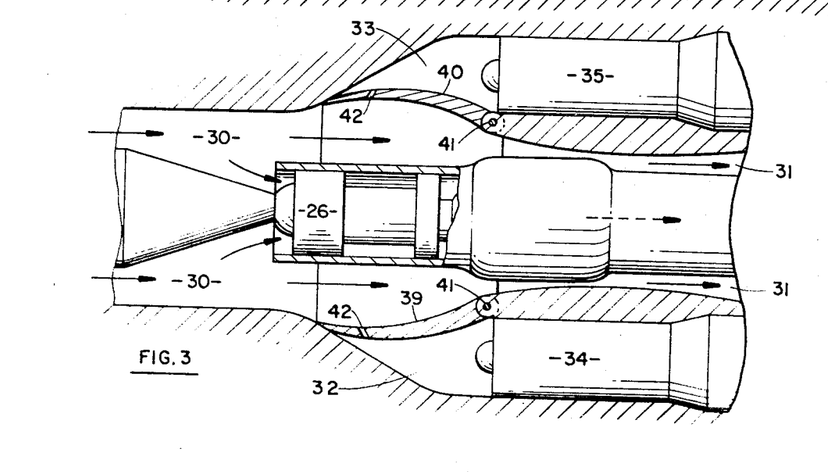
FIG. 3 shows the arrangement of FIG. 2 with a different divertor valve position.

FIG. 2 shows a partially sectioned plan view of the turbofan engine with an annular duct bypass of the preferred embodiment of FIG. 1. The different internal flow paths for the two primary modes of operation of the preferred embodiment of the propulsion system of the present invention are shown in FIGS. 2 and 3. The preferred duct configuration shown in FIGS. 2 and 3 has a pressure loss of the order of 5 percent. Other potential configurations may have pressure losses several times as large. Thus, an annular duct bypass around each auxiliary engine, i.e., a structure where the bypass 31 is eliminated and annular air bypass channels are selectively provided around each auxiliary gas generator, exhibits a pressure loss of about 25 percent. Similarly, pressure losses of about 25 percent also result if each side gas generator is provided with a parallel duct bypass. The pressure losses in the latter configuration results primarily from the afterburner and tailpipe sections. The pressure loss in the direct flow configuration of the preferred embodiment shown in FIG. 2, however, is substantially less than the other configurations mentioned and is therefore preferred. This pressure loss is primarily due to frictional effects since the duct arrangement is essentially a straight through flow system involving essentially no bending or transition of the airflow paths. The main considerations for the internal flow path of such a system are low pressure losses in the transition sections and minimum flow distortion at the face of the side or auxiliary gas generator. The Mach number in the transition section of the duct system of FIG. 2 is essentially constant thereby avoiding adverse pressure gradients in the transitions.

One mode of operation contemplated by the present invention is to allow windmilling of the auxiliary gas generators 34 and 35. This can be accomplished either by appropriate apertures 42 in the flow directing plates 39 and 40 or through the use of a bypass duct around the edge of these plates. Such an arrangement will result in a small loss of pressure and therefore thrust, but will substantially reduce the time required to obtain maximum power when operation of the side gas generators 34 and 35 is initiated. This arrangement also alleviates to some extent boattail drag problems associated with the exhaust nozzles 37 of the auxiliary engines. Another arrangement which would allow such windmilling is the elimination of the valve 38 and plates 39 and 40 and control of airflow through the auxiliary engines 34 and 35 and through the bypass 31 solely by means of the variable area exhaust nozzles 28, 37 and 43 for the main gas generator 29, auxiliary engines 34 and 35 and bypass duct 31, respectively.

Figure 4:
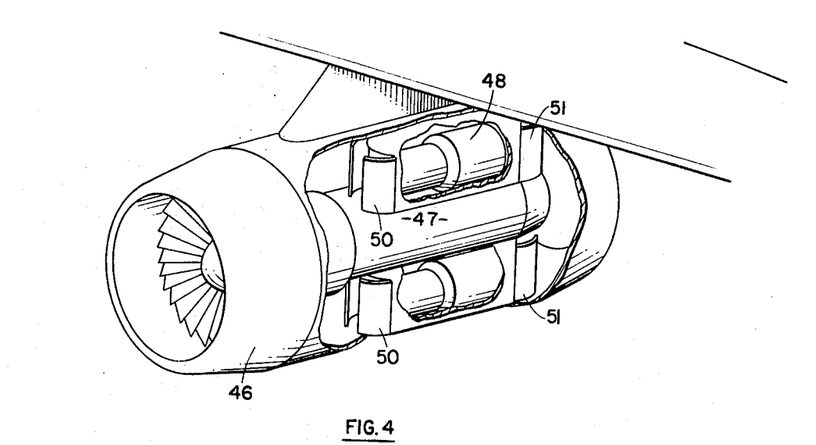
FIG. 4 is another embodiment of the present invention.

Another embodiment of the present invention is illustrated in FIG. 4. This shows the propulsion system of the present invention arranged for suspension in a pod below the wing 45 of an aircraft and designed to operate at two different subsonic flight conditions. In general this system includes a forward fan 46 driven by a main gas generator 47, as in the preferred embodiment of the present invention, and a pair of auxiliary engines 48 and 49 incorporated within the pod. Each auxiliary engine is provided with inlet airflow control valves 50 at the air intake of the auxiliary engine and exhaust nozzle control closures 51. Both auxiliary engines 48 and 49 are operated in the same manner as the preferred embodiment except that bypass air is not all directed into the auxiliary engines during their operation. Thus, in the embodiment of FIG. 4 some bypass air from the main fan 46 will pass into the exhaust at all times.

DRAG

Another essential consideration for efficient propulsion is the proper design of the fan, air duct, engine configuration to minimize boattail and base drag. The preferred embodiment illustrated in FIG. 2 is also the best arrangement for minimizing drag. In this configuration the air in fan bypass 31 is directed around the main gas generator and out the annular bypass nozzle 43 when the system is operating in the fan mode. This configuration provides low pressure drop through the bypass duct 31 but causes some boattail drag due to the absence of the appropriate airflow through the closed position of the side gas generator nozzle 37. This drag may be reduced by passing air through the auxiliary engines as described above, and using this air to maintain flow attachment over the closed nozzle surface (see FIG. 6). This air may be used to windmill the auxiliary engines if they are not maintained in a locked rotor condition. Other configurations result in substantial increases in drag over that of the preferred embodiment, for example, when the duct arrangement provides a bypass from the fan duct 30 to the auxiliary gas generator nozzles 37. Such an arrangement uses the gas generator nozzles 37 in both fan and jet modes of operation. This would minimize boattail drag, but the presence of the afterburners 36 would result in a high pressure drop in the bypass flow thereby severely penalizing performance. Another configuration utilizing a large plenum and short bypass, i.e., positioning the auxiliary engines 34 and 35 rearwardly of the main gas generator 29 and providing a large plenum in place of the directing ducts 32 and 33, would minimize base area but would result in a large fan air pressure loss when the fan discharges into the plenum. Similarly, a twin fan configuration would result in an increased pressure drop due to the fans discharging into the plenum. While these arrangements of airflow are possible in the present invention all have disadvantages over the preferred arrangement of FIGS. 1 through 3.

It is established in an integrated propulsion system particularly adapted for multimission aircraft use which has supersonic capability that back end drag can account for up to one-half of the total vehicle drag. Because of this potentially large drag, boattail angles formed by the nozzle exhaust system during each of the mission modes are extremely important. When the main gas generator 29 is operating, the variable area plug nozzle 28 makes a negligible contribution to the drag because there is such a slight boattail angle. The main drag effect results from the exhaust nozzles 37 or exit flaps on the auxiliary engines 34 and 35. Ordinarily the side gas generator nozzles are closed during operation of the main fan engine 29 in the fan mode. In this closed position they form a boattail angle of about 20°. At this angle flow separation is likely to occur unless some means of flow control is used. One possible modification to alleviate this problem and assure attached flow over the entire auxiliary gas generator nozzle surfaces is to use the blowing flap principle. The airflow for such a blowing flap arrangement could be provided by passing controlled amounts of fan discharge air through the auxiliary gas generators thereby allowing these engines to windmill. Such an airflow through the auxiliary engines would have to be directed through strategically located slots 44 (see FIG. 6) in the auxiliary gas generator nozzle 37 to assure attached flow.

INLET DUCT

Another important aspect of the propulsion system of the present invention is the engine inlet air ducting and the control of the inlet throat. The system of the present invention contemplates utilizing a self-restarting supersonic inlet and control system described in the copending application of Louis C. Young, Ser. No. 557,275, filed June 13, 1966, and entitled "Self Restarting Supersonic Inlet," the disclosure of which is incorporated herein by reference. It appears desirable to utilize a rectangular mixed compression inlet for the preferred embodiment of the present invention. The inlet may be mounted with a ramp vertically or horizontally, the former configuration permitting a shorter bifurcated duct. The horizontal ramp orientation necessiates a larger inlet because the entering airflow is directed downward before it can be turned inwards. While the horizontal ramp orientation provides a lower radar cross-section, it obstructs visibility to a greater degree. However, the horizontal ramp orientation has better performance and stability characteristics under pitch transients and is considered to have greater stability under combined pitch-yaw transients. The specific design would, of course, depend upon aircraft performance requirements. Such design considerations are well-known in the art. The flexibility of the cycle airflow requirements of the system essentially eliminates the need for a sophisticated inlet bypass system thereby also eliminating the bypass drag and weight penalties.

EXHAUST NOZZLE CONFIGURATION

Figure 5:
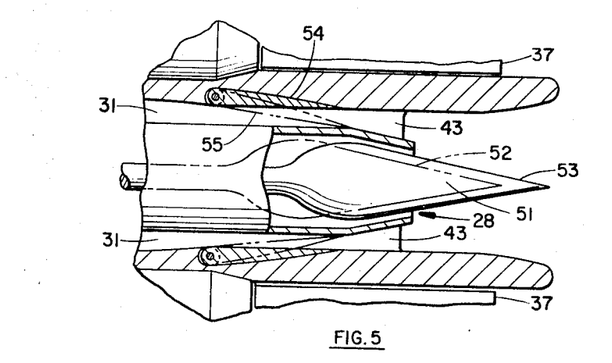
FIG. 5 shows the exhaust nozzle arrangement for the main gas generator and bypass duct of FIG. 1.
Figure 6:
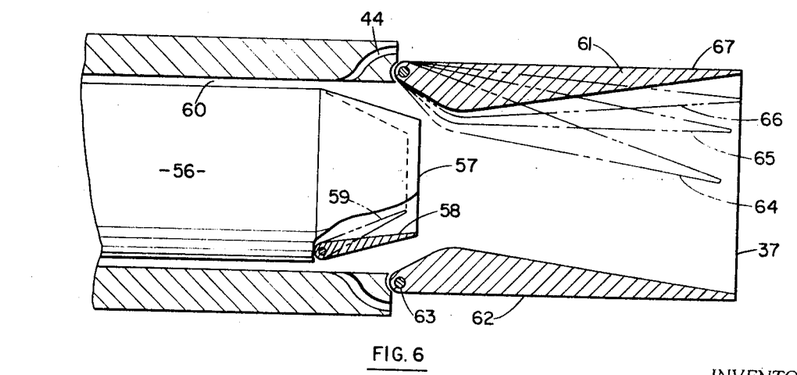
FIG. 6 shows the exhaust nozzle arrangement for the auxiliary gas generators of FIG. 1.

The configuration of the main gas generator nozzle (plug type) and side gas generator nozzle for the preferred embodiment is shown in FIGS. 5 and 6 respectively.

FIG. 5 shows the exhaust nozzle 28 of the main gas generator 29 and the variable area nozzle 43 of the fan air bypass duct 31. Various positions for the variable area exhaust nozzles are illustrated. Specifically, the main gas generator exhaust nozzle 28 is shown having a variable configuration plug 51 shown in its collapsed position 52 with the expanded position indicated at 53. Appropriate means for changing the cross-sectional area of the plug 51 are provided as is well-known in the art. The bypass duct 31 is provided with a variable area iris type closure 54 within the outlet 43. The open position for the bypass nozzle is shown in solid lines while the closed position 55 is shown in dotted lines. The bypass nozzle area may be varied between the open and closed position as required and appropriate drive means are provided for varying the exhaust area.

Figure 7:
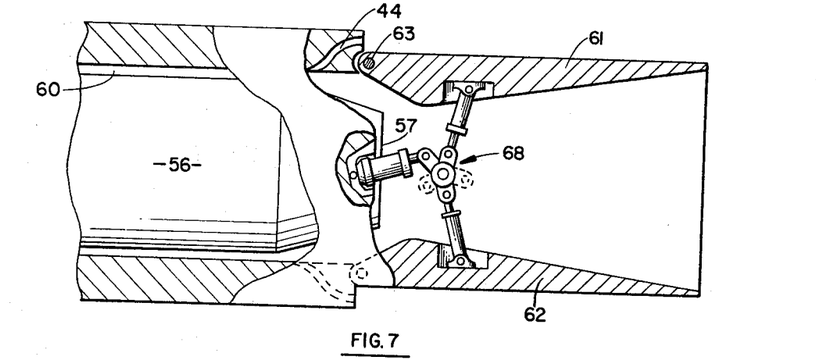
FIG. 7 is a partially sectioned exhaust nozzle showing the actuator mechanism for varying exhaust area.

FIG. 6 shows the nozzle arrangement for each of the side gas generators 34 and 35. The tailpipe 56 of the side gas generators each have a variable throat area 57 as indicated by nozzle positions 58 and 59. An annular cooling airflow at 60 is mixed with the tailpipe exhaust and emitted through the variable area exhaust nozzle 37. The nozzle 37 consists of a pair of oppositely disposed flaps 61 and 62 rotatable about shaft 63. Four positions are shown for the flap 61. The same positions would be taken by flap 62 since both are operated by the same means connected to shafts 63. These positions are indicated at 64, 65, 66 and 67 and represent the closed position, subsonic position, transonic flight position (1.2 M) and supersonic flight position (2.5 M) (with afterburner), respectively. These various exhaust nozzles are positioned by means connected to shafts 63 or by a hydraulic means 68 connected to the flaps 61 and 62 as shown in FIG. 7. Similar actuator means may be utilized for varying the area of the throat at 54 and 57.

CONTROL SYSTEM

Figure 8:
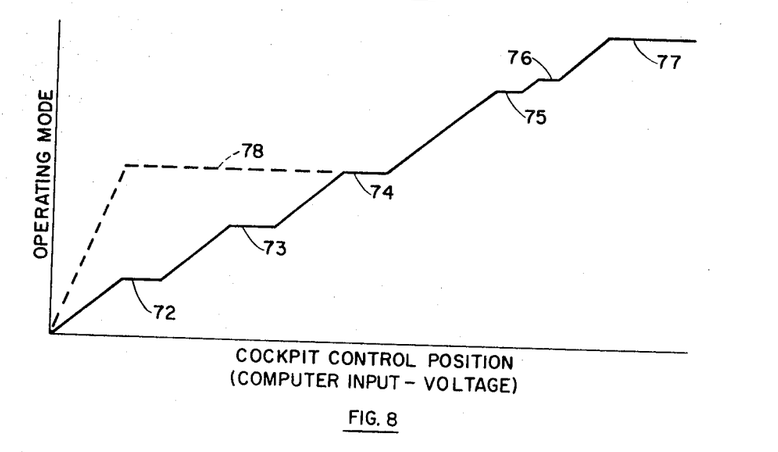
FIG. 8 is a graph of the operating modes of the propulsion system of the present invention as a function of cockpit control lever position.
Figure 9:
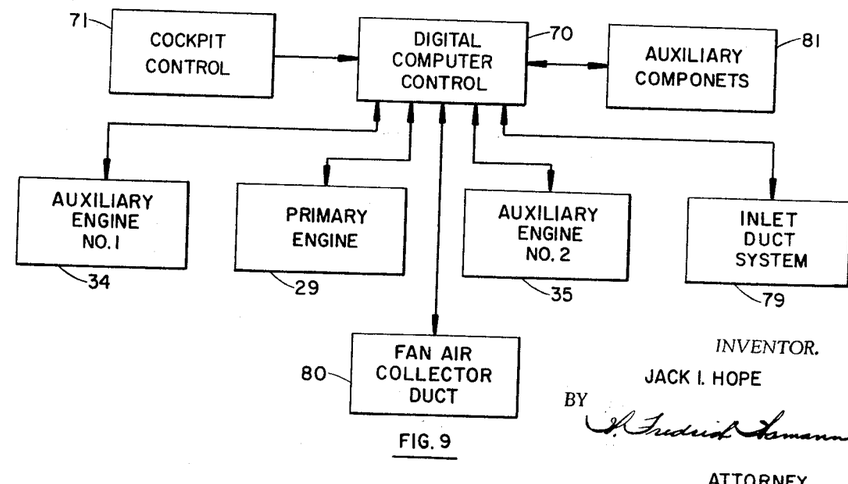
FIG. 9 is a schematic diagram of the general control system arrangement.

The integrated control system for the present invention is schematically shown in FIG. 9. This control system takes full advantage of the flexibility of the propulsion arrangement of the present invention to realize optimum performance. In general, the control system has several closed loops with all primary parameters scheduled from a single power demand input and closed through appropriate variables for precise control of the primary parameters. Operation and variation of the air inlet, the fan, the main gas generator, the auxiliary gas generators and the exhaust nozzles are integrated by the digital control system computer 70 by inlet control loops utilizing gas generator and nozzle performance characteristics to accommodate the air handling characteristics of the inlet duct. As indicated in FIG. 8 certain external commands generated by cockpit controls or power lever 71 are fed to the digital computer control system indicated generally at 70 (FIG. 9). The control program provides operating conditions depending upon the position of the power lever 71. In the example of FIG. 8 these positions represent primary engine idle speed 72, primary engine military speed 73, primary engine military speed combined with auxiliary engine idle speed 74, primary engine military speed and auxiliary engine military speed without afterburner 75, primary engine military speed and auxiliary engine military speed with minimum afterburner 76 and auxiliary engine military speed with maximum afterburner 77. In addition, the dotted line 78 indicates that one or more of the auxiliary engines 34 and 35 can be placed in an idle operating condition throughout operating modes 72 and 73 if desired. In addition, override switches may be provided for off nominal system operation so that all possible engine operating combinations are possible under manual control.

The control system utilizes a computer 70, preferably digital although an analog computer could be used, in which starting sequences, schedules, limits and control equations are stored. Operating mode commands are transmitted to the real time computer from the cockpit control 71, which is preferably a single power level lever. Based on the commands and various feedback signals, error inputs to the various actuators associated with the propulsion system components are generated. The computer is programmed, for example, to provide automatic start for the primary fan engine 29 as well as the auxiliary engines 34 and 35.

Figure 10A:
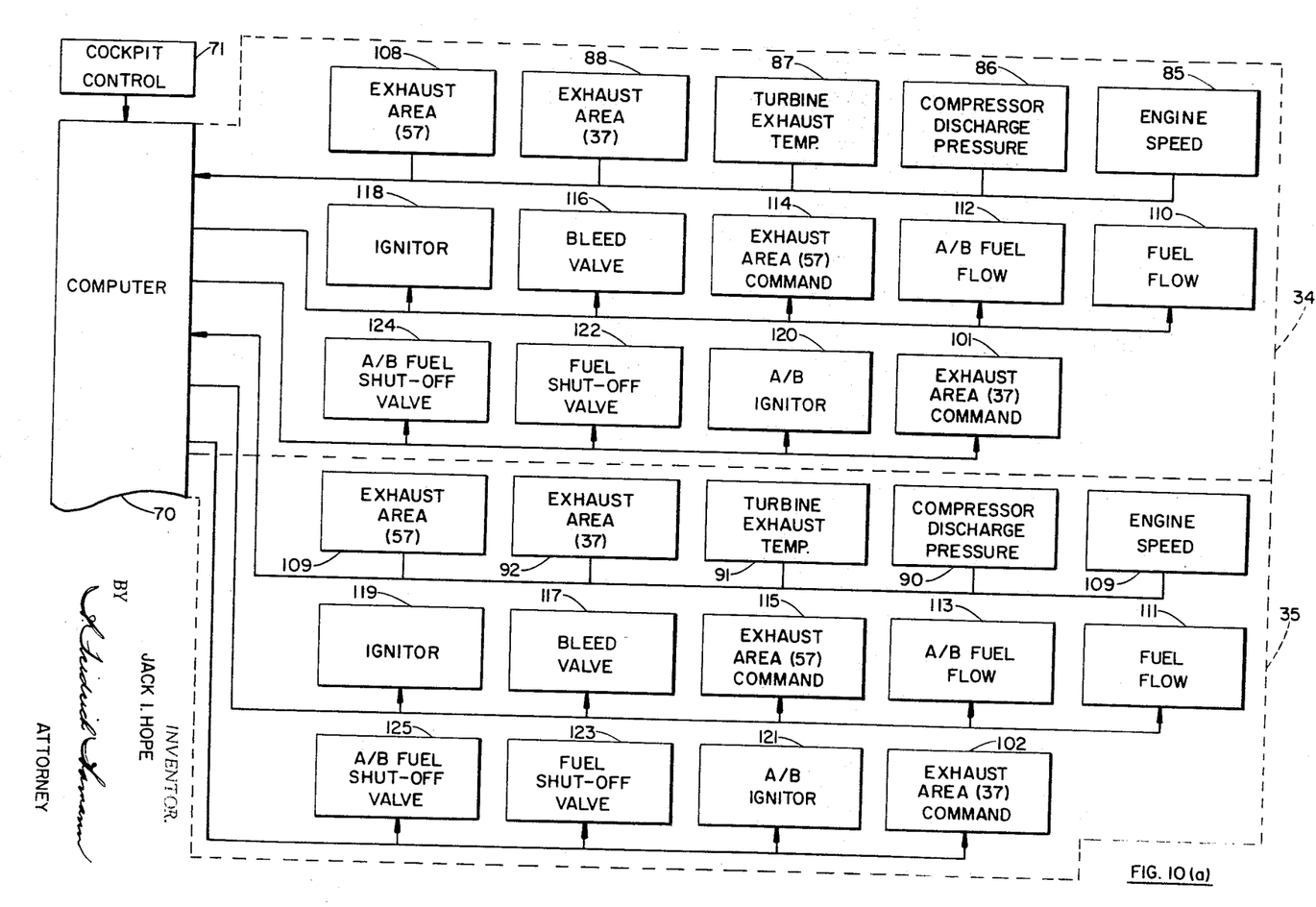
FIGS. 10(a) and (b) are detailed schematics of the digital computer inputs and propulsion system component actuators.
Figure 10B:
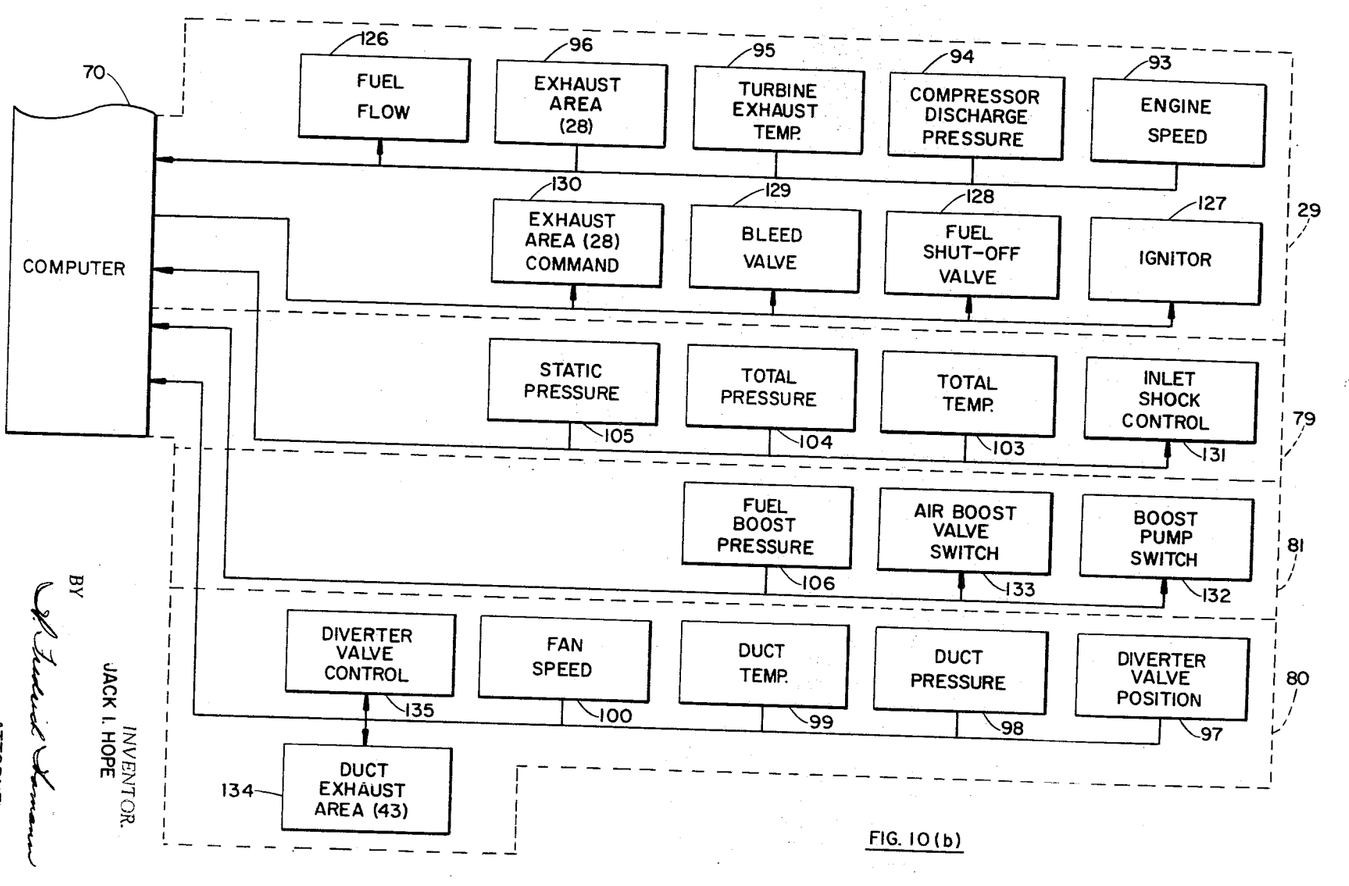

The digital computer, see FIG. 9, is interconnected with the auxiliary engines 34 and 35, the primary engine 29, the propulsion system inlet duct control 79 and the fan air collector duct control 80 and the auxiliary system control 81. This control system is shown in more detail in FIG. 10 in which the dotted areas correspond to the controls associated with the particular components as shown in FIG. 9. In each case information is provided from these same operating units by the use of sensors, this information being fed back to the computer 70 as described in detail hereinafter.

The auxiliary engine 34 contains sensors which generate signals proportional to engine speed 85, compressor discharge pressure 86, turbine exhaust temperature 87, exhaust nozzle 37 area through 88 and exhaust nozzle 57 area through 108 to the digital computer. Auxiliary engine 35 provides corresponding signals to the computer through sensors 89 through 92 and 109. The primary fan engine 29 also provides signals representing the same parameters through separate sensors 93 through 96.

The fan air collector duct control 80 for the duct 31 provides the computer with signals through sensors 97 through 100 indicating the position of the divertor valve 39 or 40, the duct pressure, the duct temperature, and fan speed, respectively. The inlet duct unit 79 includes sensors providing signals to the computer 70 representing total temperature 103, total pressure 104 and static pressure 105 in the duct. In addition, certain auxiliary components indicated generally at 81 such as a fuel boost pump, connected through sensors 106, provide a signal proportional to the fuel boost pressure.

The computer, having received signals representing the various primary parameters illustrated in FIG. 10 of the system, and the condition of the various components outlined above, controls specific variables within each of the components of the system. Thus, the auxiliary engines 34 and 35 each have a plurality of actuators for controlling each subsystem and component in the engine. In each of these respective engines actuators control exhaust area 37 through actuators 101 and 102, fuel flow 110 and 111, afterburner fuel flow 112 and 113, exhaust area 57 through actuators 114 and 115, bleed valve position 116 and 117, ignition 118 and 119, afterburner ignition 120 and 121, fuel shut-off valve 122 and 123, afterburner fuel shut-off valve 124 and 125.

The primary fan engine 29 has similar actuators controlled by computer 70 for varying fuel flow 126, initiating and terminating ignition 127, for controlling the fuel shut-off valve 128, bleed valve 129 and the area of exhaust 28 through actuator 130. The inlet duct system 79 has an actuator 131 which functions through inlet ramp control mechanism 107 (see FIG. 1) for controlling the position of the shockwave in the inlet ducts as disclosed in detail in the above referenced application. The auxiliary system 81 includes actuators 132 and 133 for the fuel boost pump switch and air boost valve switch, respectively. The fan air collector duct controller 80 receives command signals from the computer 70 which, through actuators 134 and 135, control the position of divertor valve 38 and the area of duct exhaust 43, respectively.

Figure 11:
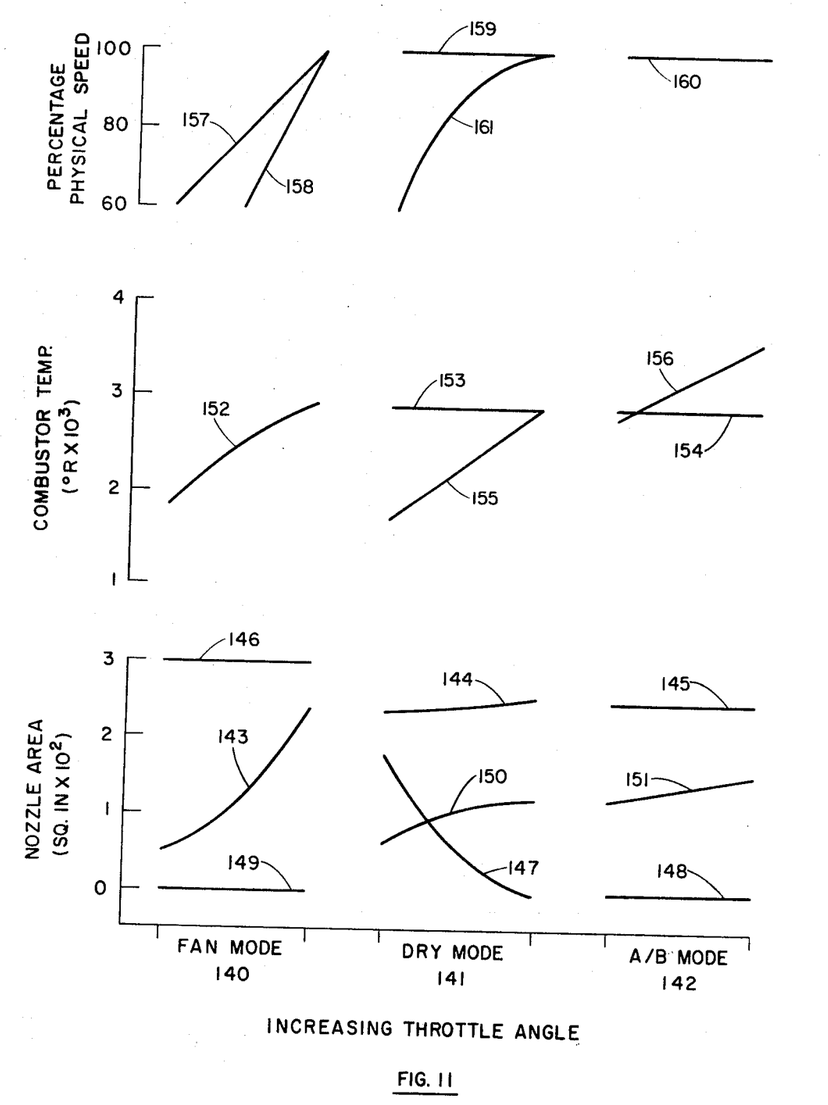
FIG. 11 is a series of curves showing a typical relationship between nozzle area, combustor temperature and corrected speed for the three operating modes of the preferred embodiment.

The computer 70 as well as the monitoring units and actuator units interconnect with the computer as shown in FIG. 11 and are standard electronic or electrical components well-known in the art and therefore are not described in detail.

OPERATION

The start mode for the primary gas generator 29 is initiated by placing the cockpit control 71 at the position 72 or above (see FIG. 8) at which position a discrete signal is received by the computer which issues a signal to actuate the main fuel boost pump through 132. When fuel pressures, as monitored through sensors 106, reach a specified minimum pressure, the computer 70 initiates the opening of the air boost valve through actuator 133 to rotate the engine. When the engine speed, as monitored by sensor 93, reaches a certain level the control program is initiated. During engine rotation the inlet guide vanes and interstage air bleed valves are controlled through actuator 129 as a function of engine speed and total temperature. An ignition signal to ignitor 127 as well as a signal opening the main engine fuel valve through actuator 128 is issued when engine speed exceeds a prescribed level. The ignition signal is eliminated when the engine has attained a preselected speed and the air boost valve switch 133 is closed. The engine speed will settle at a level determined by the position of power lever 71 and engine inlet condition. Normal shutdown is accomplished by moving the control 71 to a position below position 72 which will result in the computer 70 generating a signal to close the fuel shutoff valve through actuator 128.

Speed control is also maintained by computer 70. The preselected idle speed reference point is stored in the computer 70 with the power lever position determining the increase in mechanical speed above that point. The sum of these two speeds is the demand speed. A speed error signal is generated by subtracting the actual speed determined through sensor 93 from the demand speed. A parameter signal is generated which prevents engine flameout by providing the engine a fuel flow proportional to the compressor discharge pressure during rapid deceleration. The compressor bleed valve is actuated through 129 in response to the corrected engine speed.

When the cockpit control lever 71 is moved to position 73 (see FIG. 8), i.e., to primary engine military level, the fuel flow is increased but controlled to prevent over temperature, compressor surge and overpower. This is accomplished through closed loop temperature control or scheduling means. The engine speed will settle at the military speed level. The fan speed 25 is not controlled. However, it will be prevented from exceeding a maximum limit by means of trimming the fuel flow to engine 29 or by trimming high pressure spool speed demand. The positions of the lever 71 at points 72 through 78 are not limiting since other operating conditions exist between these positions. When the lever is moved to or above position 74 or, alternatively, if the auxiliary engines are to operate in an idle condition during both operating modes 72 and 73 (see dotted curve 78 in FIG. 8), the computer issues commands to start the auxiliary engine similar to those described above with respect to the start mode of the primary engine 29.

Specifically, the start mode of the auxiliary engines 34 and 35 involves the following steps. The computer 70 generates a signal to open the divertor valve baffle plates 39 and 40 for the engines to allow these engines to windmill. This operation does not take place if a bypass to valves 39 and 40 is provided or if divertor valve baffle plates 39 and 40 are eliminated and exhaust control relied upon as discussed above. In this latter circumstance the auxiliary engines are windmilling during the entire period indicated by the dotted line 78 of FIG. 8. When the speed of the auxiliary engines 34 and 35 exceeds a prescribed limit, as indicated by sensors 85 and 89, and provided that the fuel boost pressure measured by sensor 106 is greater than a prescribed value and, further, provided that the divertor valves 39 and 40 (if provided) are open, a signal is generated by computer 70 to initiate ignition through ignitor actuators 118 and 119. Another signal is generated to open the solenoid operated fuel shutoff valve through actuators 122 and 123. The ignitor signal is removed as soon as the temperature of the tailpipe 56, as measured through appropriate sensors, exceeds a predetermined value indicating ignition. The engine speed will then stabilize at the level determined by the power lever position 71.

The speed control for the auxiliary engines 34 and 35 is similar to that of the primary engine 29 except that for the auxiliary engines the acceleration limit is a function of the exhaust nozzle area 57 as monitored through sensors 108 and 109 and controlled through actuators 114 and 115. Exhaust nozzle areas 37, i.e., the position of flaps 61 and 62, are monitored through sensors 88 and 92 and controlled through actuators 101 and 102. The exhaust nozzle control for the primary and auxiliary engines 29, 34 and 35 is similar. Several exhaust area control modes are possible. One such mode contemplates exhaust area as an independent parameter controlled by the position of power lever 71 and inlet conditions. This mode does not allow for variations in engines or the fact that desired area may vary with ambient condition. The turbine inlet or outlet temperature demands are set as functions of the power lever position and inlet conditions. Closed loop control of the temperature is accomplished through exhaust nozzle area variation. Scheduling the turbine temperature as a function of power lever position and inlet condition and modulating the exhaust nozzle area to control this temperature provides for optimum performance from the system providing the performance requirements are consistent in terms of temperature. It provides maximum performance independent of inlet conditions and, when combined with an afterburner system, will automatically compensate for the afterburner operation. Thus, it requires no change in the basic control mode for afterburning. Regardless of the parameters scheduled as a function of power lever position, however, these approaches have the common disadvantage that the exhaust nozzle area or temperature will attempt to go directly to the requested level upon a throttle burst. In many situations this is undesirable as it increases the acceleration time and degrades the surge margin.

The other mode is to relate exhaust area to turbine speed. For example, the corrected speed is used to set a reference for the desired turbine inlet corrected temperature. The exhaust nozzle area is then modulated to obtain the desired temperature. Similarly, the exhaust nozzle area could be scheduled as a function of corrected speed. All this could be done, but at the risk of introducing stability problems. Most disadvantages associated with the first mode, however, are eliminated. Either of these modes may be utilized although the latter mode is preferred.

The temperature control is accomplished through modulation of the exhaust nozzle area 57. The speed demand and inlet conditions establish the required turbine discharge temperature or turbine inlet temperature. The difference between the required temperature and the actual temperature is used in the computer 70 to control the exhaust nozzle area through actuators 114 and 115. No change in this basic mode of control is necessary upon entering the afterburner operating mode since a very stable system results when fast acting temperature sensors are used. During rapid acceleration demand a bias will be used to open the exhaust nozzle. This bias, a function of speed error, will be limited to prevent momentary drop in thrust following issuance of rapid acceleration demand. In this manner transient time is reduced significantly.

The afterburner control presupposes that two conditions have been met prior to the initiation of the afterburner mode. First, the power lever 71 must be in the afterburner initiating position 76, or above, and the auxiliary engine speed must be greater than a preselected speed. Upon initiation of the afterburner mode a signal is generated by computer 70 to initiate the afterburner ignitor through actuators 120 and 121 and another signal is issued to open the afterburner fuel shutoff valves 124 and 125. Minimum afterburner fuel flow, controlled through 112 and 113, is directed to the metering valve regardless of the power lever position. This flow gradually increases to a level determined in response to the position of power lever 71 and the compressor discharge pressure as measured by sensors 86 and 90. The afterburner ignition actuators 120 and 121 are deenergized either when the exhaust nozzle area exceeds by more than a preselected amount the area at the time the ignitor signal was generated, or after a preselected maximum period of energization.

The engine speed often drops upon entering the afterburner mode. Thus, a safety mode is incorporated in the computer to prevent the accidental change from the afterburner mode to another mode due to the reduction in engine speed. Actual change from the afterburner mode is accomplished by moving the power lever to a position below level 76 of FIG. 8. In this position the computer generates a signal through actuators 124 and 125 which shuts the afterburner fuel flow shutoff valves 112 and 113. Fuel metering for the afterburner mode is accomplished in the same manner as that for the auxiliary and primary engines.

FIG. 11 shows some typical propulsion parameter variations for the system of the preferred embodiment of the present invention as a function of increasing power lever position. Three modes of operation are illustrated along the horizontal axis and three primary operating variables are shown along the vertical axis. In this manner three families of curves are illustrated. The first family shows the variation in nozzle area as a function of operating mode, i.e., fan mode 140, dry mode 141 and afterburner mode 142. Curves 143, 144 and 145 of this family show the nozzle area 28 profile of the main gas generator 29 for the three modes. This area increases sharply during the fan mode, slowly reaches a maximum during the dry mode and maintains this maximum area during the afterburner mode of the auxiliary engines. Curves 146, 147 and 148 show the variation in the fan nozzle throat area 43. These curves show that the bypass nozzle is fully opened during the fan mode and is decreased to a minimum opening during the dry mode as the air is diverted to the auxiliary engines. This minimum area opening is maintained during the afterburner mode. Curves 149, 150 and 151 show the increase in nozzle area of the auxiliary engines as the operating mode of the system changes from 140 to 142. Specifically, the auxiliary engine nozzles 57 are closed or maintain a minimum area opening during the fan mode as shown by curve 149. This minimum opening may allow for engine windmilling as described above. The area of nozzles 57 is increased rapidly, see curve 150, during the initial portion of the dry mode operation 141 and increases further, see curve 151, during the afterburner mode 142.

Corresponding with these nozzle area changes as illustrated by curves 143 through 151 the combustor temperature of the various engines is varied to provide the desired propulsion. Thus, curves 152, 153 and 154 show the combustor temperature for the main gas generator 29. This temperature increases during the fan mode 140 and is constant, i.e., military, during the dry 141 and afterburner 142 modes as indicated by curves 153 and 154. The auxiliary engines 34 and 35 are essentially not operating during the fan mode and so the combustor temperature is only depicted for the dry 141 and afterburner 142 modes. The auxiliary engines combustor temperatures increase as shown by curve 155 during the dry mode operation as increased speed is demanded and remains essentially constant during the afterburner mode as shown by curve 154. The afterburner temperature indicated by curve 156 increases only during the afterburner mode 142 as the afterburner fuel flow is increased to obtain increased propulsion. The top family of curves in FIG. 11 show the general relationship between percent physical speed (RPM) as a function of operating mode. Curve 157 shows the speed (RPM) in terms of percentage for the main gas generator 29, while curve 158 shows the speed (RPM) of the fan 25. Both of these speeds reach their maximum, i.e., 100 percent, at the end of the fan mode 140. Thus, the fan 25 and main gas generator 29 are at constant speed during the dry and afterburner modes as shown by curves 159 and 160. The auxiliary gas generators 34 and 35, which may be windmilling during the fan mode 140 as described above, increase rapidly in speed during the dry mode 141 as shown by curve 161. During the afterburner mode 142 no increase in the rotational speed of the engine components takes place since all are rotating at maximum rated speed as indicated by curve 160. Any change in aircraft speed during the afterburner mode is accomplished through the fuel flow control for the afterburner 36.

Although particular embodiments of the present invention have been described, various modifications will be apparent to those skilled in the art without departing from the scope of the invention. Therefore, the present invention is not limited to the specific embodiments disclosed but only by the appended claims.

I claim:

1. An aircraft propulsion system comprising a main gas generator, an air bypass duct associated with said main gas generator for passing air around said main gas generator; at least one auxiliary gas generator located adjacent to said main gas generator; means for compressing inlet air, said means being driven by said main gas generator; means for directing the output air of said compressor means to the inlet of said main gas generator, said air bypass duct and said auxiliary gas generator; said main gas generator, bypass duct and auxiliary engine each having a separate exhaust nozzle means; and means for selectively and alternatively governing the airflow in said bypass duct and said auxiliary engine, said last named means including means for varying the area of at least said bypass duct and auxiliary gas generator exhaust nozzle means.

2. The aircraft propulsion system of claim 1 wherein said main gas generator is a turbofan engine and said auxiliary gas generator is a turbojet engine, and wherein said last named means includes means for providing a secondary airflow through said turbojet engine when said main airflow is through said bypass duct.

3. The aircraft propulsion system of claim 1 wherein said main gas generator exhaust nozzle means includes means for varying the exhaust area.

4. The aircraft propulsion system of claim 1 including at least one inlet duct connected to the intake of said air compressing means, and means for controlling the airflow characteristics of said inlet duct.

5. The aircraft propulsion system of claim 1 wherein said airflow governing means includes an air diverting valve located in said air directing means.

6. The aircraft propulsion system of claim 5 including means for bypassing a selected portion of air around said bypass duct to pass through said auxiliary engines when the main airflow is through said bypass duct.

7. The aircraft propulsion system of claim 1 wherein said bypass duct forms an annular passage around said main gas generator, and including a plurality of auxiliary engines located around said annular passage.

8. The aircraft propulsion system of claim 7 including means for diverting air from said annular passage into said auxiliary engines, and means responsive to said diverting means for varying the area of said exhaust nozzle means of said bypass duct and auxiliary engine.

9. The aircraft propulsion system of claim 1 wherein said auxiliary gas generator has an afterburner located between said generator and its associated exhaust nozzle means.

10. A propulsion system for use at subsonic and supersonic speeds comprising a first propulsion unit adapted for use at subsonic speeds and at least one other propulsion unit adapted for use at supersonic speeds both of said propulsion units having air inlets connected to a common plenum, means for selectively operating said units, compressor means at the inlet end of said plenum, said compressor means being connected to and driven by said first propulsion unit, air inlet duct means connected to the intake of said compressor, bypass duct means adjacent said first propulsion unit, means for selectively controlling the airflow from said plenum to the intake of said other propulsion unit and to said bypass so that when said other units are not operating said airflow is primarily through said first unit and said bypass, said first propulsion unit and said other propulsion unit having separate exhaust nozzles, and means for varying the exhaust nozzle area in response to said selective control means.

11. An aircraft propulsion system comprising an inlet duct means, compressor means having its inlet connected to said inlet duct; a main gas generator, said main gas generator being connected to and driving said compressor means; collector duct means connected to the outlet of said compressor means and to the inlet of said main gas generator; bypass duct means around said main gas generator; at least one auxiliary engine; said collector duct means being connected to the inlets of said bypass duct and said auxiliary engine; said auxiliary engine, bypass duct, and main gas generator each having a separate exhaust nozzle; means for controlling said main gas generator, said auxiliary engine and said exhaust nozzles to maintain proper airflow and engine performance characteristics; and diverter valve means in said collector duct for selectively and alternatively directing air into either said bypass duct or said auxiliary engine inlet.

12. A method of operating an aircraft propulsion system having a primary subsonic engine and at least one auxiliary supersonic engine comprising the steps of mechanically pressurizing a quantity of air sufficient to sustain full operation of said engines, energizing said primary engine to operate in a subsonic mode while maintaining said auxiliary engine in a standby condition, said primary engine utilizing a portion of said air quantity while the remainder is directed through a bypass, energizing said auxiliary engine while simultaneously increasing the airflow through said auxiliary engine and reducing the airflow through said bypass, said primary engine being maintained in operation.

13. The method of claim 12 including the step of increasing the exhaust area of said auxiliary engine while simultaneously decreasing the exhaust area of said bypass.

14. The method of claim 12 wherein said auxiliary engine has an afterburner and said method includes the step of initiating afterburner operation when said auxiliary engine has reached a preselected dry operating temperature and increasing the nozzle area of said auxiliary engine with increased afterburner temperature.

15. A method of operating a turbofan engine and at least one turbojet engine in a plurality of modes for propelling an aircraft at selected speeds in both subsonic and supersonic ranges comprising the steps of varying the combustor temperature of the turbofan engine for fan mode operation while maintaining the turbojet engine in an inactive condition and while bypassing air around the turbofan engine; changing the airflow from the bypass path to the turbojet while initiating the operation of the turbojet; the turbofan engine operating at high RPM while the combustor temperature of the turbojet engine is varied to control the speed during the dry mode of operation, and minimizing drag in each operating mode by varying the exhaust nozzle areas of said engines and said air bypass to maintain a predetermined airflow for each operating mode.

16. The method of claim 15 wherein said turbojet includes an afterburner including the steps of initiating afterburner operation of the turbojet engine when increased power is required while maintaining the turbofan and turbojet engines at high RPM and varying the afterburner fuel flow to control the power in the afterburner operating mode.

17. The method of claim 15 including the step of windmilling the turbojet engine in its inactive condition during the fan operating mode so that the time required to initiate operation of the turbojet engine is minimized.

18. The method of claim 15 including the step of decreasing the exhaust area for the bypassing air while simultaneously increasing the exhaust area of the turbojet exhaust to change said airflow.

* * * * *